United States Patent Office 3,658,797
Patented Apr. 25, 1972

3,658,797
NOVEL 5-NITROIMIDAZOLE ANTIPARASITIC AGENTS
William James Ross, Lightwater, Surrey, and William Boffey Jamieson, Woking, Surrey, England, assignors to Eli Lilly & Co., Indianapolis, Ind.
No Drawing. Filed Aug. 4, 1969, Ser. No. 847,406
Claims priority, application Great Britain, Aug. 6, 1968, 37,562/68; Sept. 9, 1968, 42,784/68; June 27, 1969, 32,703/69
Int. Cl. C07d 49/36
U.S. Cl. 260—240 D          8 Claims

ABSTRACT OF THE DISCLOSURE 1-vinyl-2-($\beta$-arylvinyl) - 5-nitroimidazoles are active against parasites, especially trypanosomes. They can be prepared by basic condensation of an aromatic or heteroaromatic aldehyde with (1) a 1-vinyl-2-methyl-5-nitroimidazole, (2) a 1-($\beta$-acyloxy- or sulfonyloxyalkyl)-2-methyl-5-nitroimidazole followed by heating in strong base or (3) a 1-($\beta$-hydroxyalkyl)-2-methyl-5-nitroimidazole followed by esterification to form the corresponding acyloxy or sulfonyloxy ester and heating in strong base.

DESCRIPTION OF THE PRIOR ART

Substituted 5-nitroimidazoles have previously been described in the literature in a number of publications. 1-(2-hydroxyethyl)-2 - loweralkyl-4(or 5)nitroimidazoles and esters thereof are described in U.S. Pat. 2,944,061 as possessing activity against *Encamoeba histolytica* and *Trichomonas vaginalis* infections. U.S. Pat. 3,275,649 describes a process for the preparation of 1-(2-hydroxyethyl)-5-nitroimidazoles substituted in the 2-position by $C_1$-$C_5$ alkyl, aryl, aralkyl and cycloalkyl groups. More recently, U.S. Pat. 3,378,552 described 1-loweralkyl-2-($\beta$-arylvinyl)-5-nitroimidazoles and 1-(2-hydroxyethyl)-2-($\beta$-arylvinyl)-5-nitroimidazoles as intermediates in the synthesis of 5-nitroimidazole-2-carboxamides.

It is an object of the present invention to provide novel compounds possessing in vivo activity against trypanosomes. In particular, it is an object of this invention to provide novel 1-vinyl or 1-(alkylsubstituted vinyl)-2-($\beta$-arylvinyl)-5 - nitroimidazoles possessing valuable chemotherapeutic properties in the treatment of trypanosomiasis. Another object of this invention is to provide a process for preparing the compounds of the invention. A further object is to provide novel intermediates useful in the process for preparing the compounds of this invention.

The compounds of the present invention are represented by the following general formula.

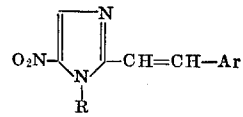

wherein R is

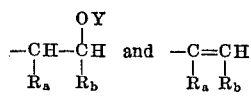

and $R_a$ and $R_b$ are hydrogen or alkyl groups consisting of from one to eight carbon atoms and Y is a good leaving group selected from the group consisting of $C_1$ to $C_8$ acyl, $C_1$ to $C_3$ alkylsulfonyl, $C_1$ to $C_3$ alkylphenylsulfonyl and halophenylsulfonyl; and wherein Ar is an aryl or heteroaryl group of the formula Z—Q wherein Z is phenyl, naphthyl, biphenylyl, thienyl, furyl, pyrryl, pyridyl, thiazolyl, and imidazolyl, Q is hydrogen, $C_1$ to $C_8$ alkyl, $C_1$ to $C_4$ lower alkoxy, halogen, carboxy, carbalkoxy, carboxamido, trifluoromethyl, nitro, amino, monoalkylamino, di-lower alkylamino, aminoethyl, monoalkylaminomethyl, dialkylaminoethyl, hydroxymethyl, formyl or 1,3-dioxa-2-cyclopentyl.

The term "$C_1$ to $C_4$ lower alkyl" as employed herein refers to methyl, ethyl, n-propyl, iso-propyl, n-butyl, sec-butyl and t-butyl. "$C_1$ to $C_4$ lower alkoxy" refers to methoxy, ethoxy, n-propoxy, iso-propoxy, n-butoxy, sec-butoxy, and tert-butoxy. Halogen refers to fluorine, chlorine, bromine and iodine. The term "carbalkoxy" refers to the $C_1$ to $C_4$ lower alkyl esters of a carboxy substitutent such as carbomethoxy, carboethoxy, carbopropoxy, carbutoxy and the like. The term "dialkylamino" refers to the $C_1$ to $C_4$ lower alkyl substituted amino groups as for example, dimethylamino, diethylamino, di-n-propylamino and the like, and the term "dialkylaminomethyl" refers to an aminomethyl group wherein the amino nitrogen atom is disubstituted by $C_1$ to $C_4$ lower alkyl groups or, when taken together with its substituting groups, forms a five or six membered nitrogen containing ring. For example, dialkylaminomethyl can be dimethylaminomethyl, diethylaminomethyl, di-n-butylaminomethyl, pyrrolidinomethyl, piperidinomethyl, morpholinomethyl, thiomorpholinomethyl, piperazinomethyl, and the like.

The term "good leaving group" refers to an acyl, sulfonyl or similar acid group which, when esterified, readily undergoes alkyl oxygen fission to form a relatively

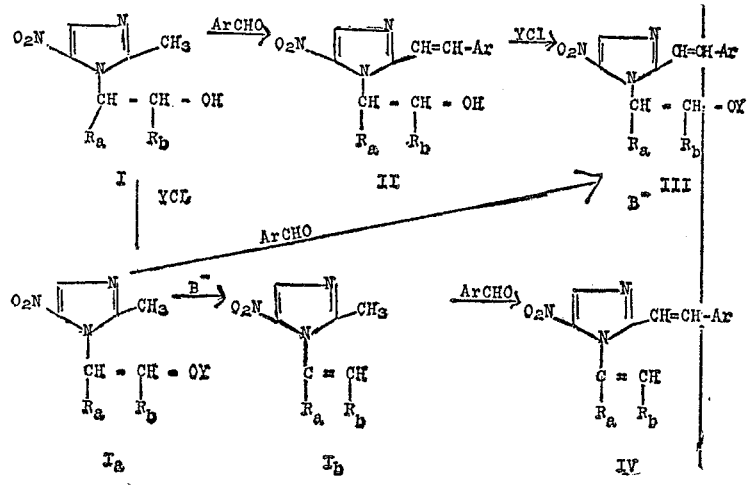

stable leaving anion. The term is readily understood and the groups which satisfy the definition are well known to those skilled in the art. For example, Y can be an acetyl, a p-toluenesulfonyl, p-bromophenylsulfonyl, methanesulfonyl or like radical.

The above reaction scheme depicts the alternative synthetic pathways employed for the preparation of the novel compounds of this invention.

According to the above reaction scheme a 1 - ($\beta$-hydroxyalkyl) - 2 - methyl - 5 - nitroimidazole of Formula I is reacted with an aromatic aldehyde or a heteroaromatic aldehyde in the presence of a strong base to form a 1-($\beta$-hydroxyalkyl) - 2 - ($\beta$-arylvinyl) - 5 - nitroimidazole of Formula II, wherein $R_a$, $R_b$ and Ar have the same meanings as previously assigned. The compound of Formula II is then reacted with the acid chloride, YCl, of a good leaving group as previously defined, to obtain an ester of the Formula III. The ester of Formula III when heated in the presence of a strong base provides a compound of the invention, a 1-vinyl-2-($\beta$-arylvinyl)-5-nitroimidazole of Formula IV.

Alternatively, the compounds of this invention can be obtained by first esterifying the 1-($\beta$-hydroxyalkyl)-2-methyl - 5 - nitroimidazole of Formula I with the acid chloride YCl and then heating the ester product of the Formula $I_a$ in the presence of a strong base to obtain a 1-vinyl - 2 - methyl - 5 - nitroimidazole of Formula $I_b$. Reaction of the 1-vinyl compound $I_b$ with an aromatic aldehyde in the presence of a strong base leads to a compound of the invention.

As a further alternative method of preparing the compounds of this invention, the compound of Formula $I_a$, a 1 - ($\beta$-acyloxy or sulfonyloxy alkyl)-2-methyl-5-nitroimidazole can be reacted with an aromatic aldehyde in the presence of a strong base to obtain the corresponding $\beta$-arylvinylnitroimidazole of Formula III which, by the previously described base treatment, affords a compound of the invention of Formula IV.

The preferred method of preparing the compounds of this invention is the first method described above, proceeding from a compound of Formula I through Formulas II and III to obtain a compound of the invention of the Formula IV.

DETAILED DESCRIPTION

In the first step of the preferred synthesis, a 1-($\beta$-hydroxyalkyl) - 2 - methyl - 5 - nitroimidazole of Formula I, wherein $R_a$ and $R_b$ have the same meaning as previously assigned, is reacted with an aromatic aldehyde or a heteroaromatic aldehyde in the presence of a strong base to provide a 1-($\beta$-hydroxyalkyl)-2-($\beta$-arylvinyl)-5-nitroimidazole of Formula II. The reaction is carried out in a suitable solvent, preferably an alcohol such as methanol, ethanol, isopropanol, n-butanol or the like, although other commonly used solvents such as dimethylformamide, dimethylsulphoxide or tetrahydrofuran can be employed.

The foregoing condensation reaction is carried out in the presence of strong bases such as the alkali and alkaline earth metal alkoxides and the alkali metal hydroxides. For example, sodium methoxide, sodium ethoxide, sodium isopropoxide, potassium hydroxide and the like are suitable basic reagents. Generally, the reaction is carried out by using a molar excess of base; however, a ratio of about 0.4 to 2.5 moles of base per mole of starting imidazole is operative to yield the desired condensation product.

A reaction temperature of about 20 to about 70° C. is preferred; however higher temperatures can be employed. Usually, the reaction product, a 1-($\beta$-hydroxyalkyl) - 2 - ($\beta$-arylvinyl) - 5 - nitroimidazole, precipitates from the reaction mixture on cooling and can be purified by recrystallization.

Aromatic aldehydes or heteroaromatic aldehydes such as benzaldehyde, p-tolualdehyde, anisaldehyde, p-chlorobenzaldehyde, thiophene - 2 - aldehyde, thiazole-2-aldehyde, pyridine - 2 - aldehyde, pyrrole-2-aldehyde, furfural, $\alpha$-naphthaldehyde, nicotinaldehyde, 1 - methylimidazole-2 - carboxaldehyde and the like can be employed in the reaction.

The aldehyde condensation product of Formula II is then esterified with an acid chloride of a good leaving group, YCl, to to obtain a 1 - ($\beta$ - acyloxyalkyl)-2-($\beta$-arylvinyl) - 5 - nitroimidazole of Formula III, wherein Y has the same meaning as previously described. The term "acid chloride of a good leaving group" refers to the chloride of an acid which will react with an alcohol to form an ester, which ester will undergo alkyl oxygen fission to form a relatively stable leaving anion. Examples of such acid chlorides, YCl, useful in the present invention are p-toluenesulfonyl chloride (tosyl chloride), p-bromophenylsulfonyl chloride (brosyl chloride) and methanesulfonyl chloride (mesyl chloride).

The esterification is carried out in the usual manner in the presence of a base such as pyridine. Pyridine is preferably used as the solvent as well, but other unreactive solvents such as tetrahydrofuran or dimethylformamide can be employed. The acid chloride, for example, tosyl chloride, is added dropwise to a cooled solution of the 1 - ($\beta$ - hydroxyalkyl) - 2 - ($\beta$ - arylvinyl) - 5 - nitroimidazole in pyridine and the reaction mixture allowed to stand for several hours at room temperature. The ester product precipitates from the reaction mixture on dilution with water.

The 1 - ($\beta$ - acyloxy or sulfonyloxy alkyl) - 2 - ($\beta$-arylvinyl) - 5 - nitroimidazole of Formula III upon heating in the presence of a strong base in a suitable unreactive solvent undergoes cleavage of the alkyl acyloxy or alkyl sulfonyloxy ester bond to yield a 1 - vinyl - 2 - ($\beta$-arylvinyl)-5-nitroimidazole of Formula IV.

The reaction is performed at a temperature between about 50 and 100° C. in the presence of a strong base such as one previously described in the preparation of the 2-($\beta$-arylvinyl) - 5 - nitroimidazole precursor. The choice of reaction solvent is not critical and the common alcohols such as methanol, ethanol, isopropanol and the like are suitable. Generally the reaction proceeds to completion in about 30 minutes and the product obtained in crystalline form from the cooled reaction mixture.

Alternatively, as mentioned above, the compounds of the invention can be prepared by first esterifying the 1-($\beta$-hydroxyalkyl) - 2 - methyl - 5 - nitroimidazole I, to obtain the ester, $I_a$, followed by base condensation with an aroratic or heteroaromatic aldehyde to obtain the 1-($\beta$-acyloxy or sulfonyloxy alkyl) -2 - ($\beta$ - arylvinyl) - 5 - nitroimidazole III. On heating in the presence of a strong base, III affords a compound of the invention IV.

In a further alternative method for the preparation of the compounds of the invention, a compound of Formula I is esterified and the ester of Formula $I_a$ obtained thereby is treated with a strong base to yield a 1-(vinyl)-2-methly-5-nitroimidazole of Formula $I_b$. The condensation of $I_b$ with an aromatic or heteroaromatic aldehyde is carried out in the presence of a strong base, under conditions essentially the same as previously described for the preparation of a compound of Formula II, to yield a compound of the invention of Formula IV.

The reaction conditions for each step of the above-described alternative synthetic pathways are generally the same as those employed in the first described preferred method.

In some instances in the preparation of compounds of Formula II the desired substituent on the aryl aldehyde is a reactive group requiring protection during the condensation reaction. The protective group is then removed following condensation of the aldehyde with the 2-methylimidazole. For example, the amino group can be protected by acetylation, and the formyl group by the formation of the stable ethylene acetal formed with ethylene glycol. Hydrolysis of the protecting group provides the desired compound.

Certain desired substituent groups such as the carboxyl, hydroxymethyl, aminomethyl, morpholinomethyl and dimethylamino are conveniently prepared from the above mentioned amino and formyl substituents by methods well known in the art. For example, 1 - vinyl - 2 - [β-(4-carboxyphenyl)vinyl] - 5 - nitroimidazole is prepared by the oxidation of the corresponding 4-formyl compound with chromic acid. 1-propenyl - 2 - [β-(4-hydroxymethylphenyl)vinyl] - 5 - nitroimidazole is prepared from the corresponding 4-formyl compound by reduction with sodium borohydride. The compounds of the general formula wherein Ar is substituted by an aminomethyl group can be prepared by preparation of the tosylate of the hydroxymethyl compounds and reaction with ammonia. Likewise the monoalkylamino methyl and dialkylaminomethyl substituted compounds such as 1-vinyl - 2 - [β-(4-methylaminomethylphenyl)vinyl] - 5 - nitroimidazole and 1-vinyl - 2 - [β - (4 - morpholinomethylphenyl)vinyl-5-nitroimidazole can be prepared from the corresponding 4-formyl substituted compound by reaction with the appropriate primary or secondary amine. Alternatively the compounds may be prepared by reaction of the corresponding halo methyl compound with the appropriate amine.

The compounds of the general formula wherein Ar is substituted by carboxy can be converted to the corresponding esters by procedures commonly employed for the esterification of carboxylic acids. Likewise, amides can be prepared from the carboxyl substituted compounds by the usual methods.

The starting materials for the preparation of the compounds of this invention are obtained by the N-alkylation of 2 - methyl - 5 - nitroimidazole with an hydroxyalkylating agent such as a 2-haloalkanol or an epoxyalkane. 2-methyl - 5 - nitroimidazole undergoes N-alkylation in the absence of a base to yield required compounds.

Hydroxyalkylating agents which can be employed in the preparation of the starting materials include 2-chloroethanol,
2-chloro-1-propanol,
2-chloro-1-butanol,
1-chloro-2-butanol,
3-chloro-2-butanol,
3-bromo-2-butanol,
1-chloro-2-methyl-2-propanol,
2-chloro-1-pentanol,
1-chloro-2-pentanol,
3-bromo-2-pentanol,
3-bromo-2-methyl-2-butanol,
2-chloro-1-hexanol,
1-chloro-2-hexanol,
2-chloro-3-hexanol,
1-chloro-2-heptanol,
1-chloro-2-octanol,
1-chloro-4-ethyl-2-hexanol,
1-chloro-2-decanol, and the like.

The starting compounds can likewise be prepared when oxiranes, also known as epoxyalkanes, are employed as the hydroxyalkylating agents. For example, the appropriate epoxyalkane can be reacted in the presence of formic acid with 2-methyl-5-nitroimidazole in a suitable unreactive solvent to provide the desired substituted starting material, a 1-(β-hydroxyethyl)-2-methyl-5-nitroimidazole.

Examples of compounds of this invention represented by the Formula IV are 1-vinyl-2-(β-phenylvinyl)-5-nitroimidazole,
1-vinyl-2-[β-(4-methylphenyl)vinyl]-5-nitroimidazole,
1-vinyl-2-[β-(3,4-dimethylphenyl)vinyl]-5-nitroimidazole,
1-vinyl-2-[β-(2-chlorophenyl)vinyl]-5-nitroimidazole,
1-vinyl-2-[β-(4-chlorophenyl)vinyl]-5-nitroimidazole,
1-vinyl-2-[β-(3,4-dichlorophenyl)vinyl]-5-nitroimidazole,
1-vinyl-2-[β-(2-methylphenyl)vinyl]-5-nitroimidazole,
1-vinyl-2-[β-(3-trifluoromethylphenyl)vinyl]-5-nitroimidazole,
1-vinyl-2-[β-(4-ethylphenyl)vinyl]-5-nitroimidazole,
1-vinyl-2-[β-(4-isopropylphenyl)vinyl]-5-nitroimidazole,
1-vinyl-2-[β-(4-n-butylphenyl)vinyl]-5-nitroimidazole,
1-vinyl-2-[β-(4-methoxyphenyl)vinyl]-5-nitroimidazole
1-vinyl-2-[β-(3,4,5-trimethoxyphenyl)vinyl]-5-nitroimidazole,
1-vinyl-2-(β-(2-furylvinyl)-5-nitroimidazole,
1-vinyl-2-(β-(2-thienylvinyl)-5-nitroimidazole,
1-vinyl-2-[β-(1-methyl-2-imidazolyl)vinyl]-5-nitroimidazole,
1-vinyl-2-[β-(2-naphthyl)vinyl]-5-nitroimidazole,
1-vinyl-2-[β-(4-hydroxymethylphenyl)vinyl]-5-nitroimidazole,
1-vinyl-2-[β-(4-formylphenyl)vinyl]-5-nitroimidazole,
1-vinyl-2-[β-(4-carboxyphenyl)vinyl]-5-nitroimidazole,
1-vinyl-2-[β-(4-dimethylaminophenyl)vinyl]-5-nitroimidazole,
1-vinyl-2-[β-(4-morpholinomethylphenyl)vinyl]-5-nitroimidazole,
1-vinyl-2-[β-(2-pyridyl)vinyl]-5-nitroimidazole,
1-propenyl-2-[β-(4-methyl-3-pyridyl)vinyl]-5-nitroimidazole,
1-(Δ¹-butenyl)-2-[β-(4-formylphenyl)vinyl]-5-nitroimidazole,
1-(Δ³-hexenyl)-2-[β-(4-methylphenyl)vinyl]-5-nitroimidazole,
1-(Δ¹-octenyl)-2-[β-(4-isopropylphenyl)vinyl]-5-nitroimidazole,
1-(Δ⁵-dodecenyl)-2-(β-phenylvinyl)-5-nitroimidazole,
1-vinyl-2-[β-(4-formylphenyl)vinyl]-5-nitroimidazole thiosemicarbazone, and
1-vinyl-2-[β-(4-phenylphenyl)vinyl]-5-nitroimidazole,
1-propenyl-2-[β-(4-carbethoxyphenyl)vinyl]-5-nitroimidazole,
1-vinyl-2-[β-(2-thiazyl)vinyl]-5-nitroimidazole,
1-vinyl-2-[β-(3-carboxamidophenyl)vinyl]-5-nitroimidazole,
1-vinyl-2-[β-(4-aminomethylphenyl)vinyl]-5-nitroimidazole hydrochloride,
1-propenyl-2-[β-(4-thiomorpholinomethylphenyl)vinyl]-5-nitroimidazole,
1-vinyl-2-[β-(5-imidazolyl)vinyl]-5-nitroimidazole,
1-vinyl-2-[β-(2,6-dimethyl-4-pyridyl)vinyl]-5-nitroimidazole,
1-vinyl-2-[β-(4-methyl-2-thienyl)vinyl]-5-nitroimidazole,
1-propenyl-2-[β-(5-methyl-2-imidazolyl)vinyl]-5-nitroimidazole,
1-(Δ⁷-tetradecenyl)-2-(β-phenylvinyl)-5-nitroimidazole,
1-(Δ⁵-dodecenyl)-2-[β-(4-methylphenyl)vinyl]-5-nitroimidazole,
1-vinyl-2-[β-(2-pyrrylphenyl)vinyl]-5-nitroimidazole.

The novel 1-vinyl or 1-(alkyl substituted vinyl)-2-(β-arylvinyl)-5-nitroimidazoles of this invention are useful chemotherapeutic agents. In particular, the compounds of this invention are useful in the treatment of diseases caused by infectious protozoa, especially the trypanosomes, *Trypanosoma rhodesiense*, *T. Cruzi*, *T. gambiense* and *T. congolense*. The compounds are also valuable agents for the treatment and control of infections caused by amoebae or trichmonads, for example, *Entamoeba histolytica* and *Trichomonas vaginalis* infections.

Accordingly the compounds of the general formula wherein R is

are effective when administered parenterally at doses of between about 25 to 500 mg./kg. per day for at least 3 days in the treatment of trypanosomiasis. It will be understood by those skilled in the art that the size of the dose and the frequency and duration of administration will vary, depending upon such conditions as the severity and duration of the infection, the species of parasitic organisms involved, the size of the parasitinized host, the general health of the host and the like. For example, when administered parenterally at a dose of about 25 to 500 mg./kg. to mice infected with trypanosomes the compounds of the invention were effective in prolonging the survival time of the infected mice over the nontreated control mice. In many instances, negative parasitemia was observed after 30 days following treatment of infected mice at doses between about 100 and 500 mg./kg.

The 1-vinyl compounds of the invention have a relatively low mammalian toxicity. For example, the $LD_{50}$ in mice is from about 600 to greater than 1000 mg./kg., i.p.

The 1-vinyl compounds can be administered with a suitable pharmaceutical carrier commonly employed for parenteral preparations.

The compounds of this invention of the general formula, wherein R is

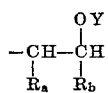

and $R_a$, $R_b$ and Y have the same meaning as previously designated, are valuable intermediates useful in the preparation of the 1-vinyl-2-($\beta$-arylvinyl)-5-nitroimidazole compounds of the invention as described herein.

The following examples further illustrate the present invention.

EXAMPLE 1

1-vinyl-2-methyl-5-nitroimidazole

To an ice cooled solution of 50 g. (0.29 mole) of 2-methyl-5-nitroimidazole-1-ethanol in 290 ml. of pyridine was gradually added with stirring 57 g. (0.3 mole) of p-toluenesulfonyl chloride. The clear, pale yellow reaction mixture was allowed to stand overnight at room temperature and then poured into 8 l. of ice water with stirring. The solid precipitate was filtered and washed with water to yield 86.1 g. of 2-methyl-5-nitroimidazole-1-ethanol p-toluenesulfonate as pale cream needles, melting at about 153° C.

A solution of sodium (6.1 g., 0.27 atom) in 150 ml. of ethanol was added rapidly to a stirred solution of 86 g. (0.26 mole) of the above tosylate in 500 ml. of ethanol at a temperature of about 70° C. Stirring was continued at 70° C. for about 30 minutes and the reaction mixture then allowed to cool to room temperature. After standing at room temperature for about four hours, the dark brown reaction mixture was filtered and the filtrate evaporated to a volume of about 100 ml. The concentrate was diluted with 500 ml. of water and extracted four times with 250 ml. portions of ether. The ether extracts were combined and treated with carbon before drying over sodium sulfate. The dried ether extract was evaporated to a volume of about 100 ml. and n-hexane added carefully to cause the precipitation of a red oil. The red oily precipitate was discarded and the extract diluted further with n-hexane to precipitate 22.9 g. of the product, 1-vinyl-2-methyl-5-nitroimidazole as golden yellow needles melting at about 49–50° C.

EXAMPLE 2

1-vinyl-2-($\beta$-phenylvinyl)-5-nitroimidazole 1-vinyl-2-methyl-5-nitroimidazole, 5 g. (0.032 mole) and benzaldehyde, 5 ml. (ca. 0.05 mole) were dissolved in 50 ml. of ethanol and 3 ml. of a 4 N sodium hydroxide solution added. The brownish reaction solution was allowed to stand at room temperature for about 3 hours with occasional shaking. A crystalline solid precipitated, was filtered and washed with cold ethanol to yield 5.3 g. of hydrated product 1-vinyl-2-($\beta$-hydroxy-$\beta$-phenyl)ethyl-5-nitroimidazole melting at about 165–166° C.

*Analysis.*—Calc. for $C_{13}H_{13}N_3O_3$ (percent): C, 60.2; H, 5.06; N, 16.2. Found (percent): C, 60.1; H, 5.19; N, 16.1.

1-vinyl-2-($\beta$-hydroxy-$\beta$-phenyl)ethyl-5-nitroimidazole, 16.5 g. (0.064 mole) was refluxed for about one hour with 80 ml. of acetic anhydride. The reaction mixture was cooled to room temperature and poured over 300 g. of ice. The precipitated solid was filtered, washed with water and recrystallized from ethanol to yield 7.4 g. of 1-vinyl-2-($\beta$-phenylvinyl)-5-nitroimidazole as golden yellow needles melting at about 159–160° C.

*Analysis.*—Calc. for $C_{13}H_{11}N_3O_2$ (percent): C, 64.7; H, 4.58; N, 17.4. Found (percent): C, 64.7; H, 4.68; N, 17.3.

EXAMPLE 3

1-$\beta$-hydroxyethyl-2-[$\beta$-(4-isopropylphenyl)vinyl]-5-nitroimidazole

A solution of 10.5 g. of sodium (0.45 g. atom) in 150 ml. of methanol was added rapidly to a stirred solution of 51.1 g. of 2-methyl-5-nitroimidazole-1-ethanol (0.3 mole) and 60 ml. (ca. 0.4 mole) of 4-isopropylbenzaldehyde in 500 ml. of ethanol at a temperature of about 70° C. Stirring was continued for about 30 minutes at 70° C., the dark brown reaction solution then cooled to room temperature and diluted with an equal volume of water. The crystalline precipitated was filtered and recrystallized from ethanol to yield 19.1 g. of 1-$\beta$-hydroxyethyl-2-[$\beta$-(4-isopropylphenyl)vinyl]-5-nitroimidazole as yellow platelets melting at about 171–172° C.

EXAMPLE 4

1-($\beta$-p-toluenesulfonyloxyethyl)-2-[$\beta$-(4-isopropylphenyl)vinyl]-5-nitroimidazole 1-($\beta$-hydroxyethyl)-2-[$\beta$-(4-isopropylphenyl)vinyl]-5-nitroimidazole, 3.01 g. (0.1 mole) was dissolved in 200 ml. of pyridine and 19.1 g. (0.1 mole) of p-toluenesulfonyl chloride added gradually to the stirred solution cooled in an ice bath. The dark yellow brown solution was allowed to stand overnight at room temperature and then poured into 3 l. of an ice water mixture with stirring. The solid precipitate was filtered and recrystallized from ethanol to yield 32.2 g. of 1-($\beta$-p-toluenesulfonyloxyethyl)-2-[$\beta$-(4-isopropylphenyl)vinyl]-5-nitroimidazole as fine yellow needles melting at about 148–149° C.

*Analysis.*—Calc. for $C_{23}H_{25}N_3O_5S$ (percent): C, 60.7; H, 5.54; N, 9.23. Found (percent): C, 60.9; H, 5.34; N, 9.46.

EXAMPLE 5

1-vinyl-2-[$\beta$-(4-isopropylphenyl)vinyl]-5-nitroimidazole

A solution of 1.2 g. of sodium 0.052 g. atom in 50 ml. of ethanol was added rapidly to a stirred solution of 1-($\beta$-p-toluenesulfonyloxyethyl)-2-[$\beta$-(4-isopropylphenyl)vinyl]-5-nitroimidazole in 600 ml. of ethanol at a temperature of about 70° C. Stirring was continued at 70° C. for about 30 minutes and then the reaction mixture allowed to stand overnight at room temperature. The yellowish-white crystalline precipitate which formed was filtered and washed with water to yield 8.6 g. of 1-vinyl-2-[$\beta$-(4-isopropylphenyl)vinyl]-5-nitroimidazole as bright yellow needles melting at about 122–123° C.

*Analysis.*—Calc. for $C_{16}H_{17}N_3O_2$ (percent): C, 67.8; H, 6.05; N, 14.8. Found (percent): C, 67.7; H, 5.75; N, 14.8.

The mother liquor was concentrated to yield additional solid which on recrystallization from ethanol yielded 3.2 g. of further product melting at about 122–123° C.

EXAMPLE 6

1-vinyl-2-(β-pyrid-3-yl-vinyl)-5-nitroimidazole 1-vinyl-2-methyl - 5 - nitroimidazole, 30.6 g. (0.2 mole) and 22 ml. (0.2 mole) of pyridine-3-carboxaldehyde were dissolved in 200 ml. of ethanol and 18 ml. of a 4 N sodium hydroxide solution added. The brownish reaction solution was refluxed for about 3 hours and then cooled and maintained at a temperature of about 0° C. overnight. The crystalline precipitate which formed was filtered, washed with cold ethanol and recrystallized from ethanol with carbon treatment to yield 8.7 g. of 1-vinyl-2-(β-pyrid-3-yl-vinyl)-5-nitroimidazole melting at about 158–159° C.

*Analysis.*—Calcd. for $C_{12}H_{10}N_4O_2$ (percent): C, 59.5; H, 4.17; N, 23.1. Found (percent): C, 59.3; H, 4.27; N, 23.1.

EXAMPLE 7

1-(β-hydroxyethyl-2-[β-(4-formylphenyl ethylene acetyl)vinyl]-5-nitroimidazole To a solution of 17.1 g. (0.1 mole) of 2-methyl-5-nitroimidazole-1-ethanol and 27 g. of terephthalaldehyde monoethylene acetal in 60 ml. of dimethylsulfoxide was added with stirring at room temperature a solution of 3.5 g. of sodium in 60 ml. of methanol and the reaction mixture allowed to stand overnight. The dark brown reaction-mixture was diluted with an equal volume of water, and cooled to precipitate a viscous dark brown oil. The supernatant was decanted and the oil dissolved in ethanol-water. On cooling, a heavy crystalline precipitate of product was formed. The product was filtered and dried to yield 15.6 g.

EXAMPLE 8

1-(β-p-toluenesulfonyloxyethyl)-2-[β-(4-formylphenyl-ethylene acetal)vinyl]-5-nitroimidazole To a solution of 10.8 g. (0.033 mole) of 1-(β-hydroxyethyl) - 2 - [β-(4-formylphenyl ethylene acetal)vinyl]-5-nitroimidazole in 30 ml. of dry pyridine was added with stirring and cooling a solution of 6.6 g. (0.035 mole) of p-toluenesulfonyl chloride in 25 ml. of dry pyridine and the reaction mixture allowed to stand overnight. The crystalline precipitate was filtered and dried to yield 9.8 g. of the tosylate. A second crop of crystals 4.3 g., was obtained by dilution of the filtrate with water.

EXAMPLE 9

1-vinyl-2-[β-(4-formylphenyl ethylene acetal)vinyl]-5-nitroimidazole

A suspension of 14 g. (0.029 mole) of the tosylate prepared as described in Example 8 was warmed to 70° C. and a solution of 0.67 g. of sodium in 15 ml. of ethanol added with stirring. After a reaction time of about 30 minutes, the reaction mixture was cooled and stored in refrigerator for 2 hours. The crystalline, brownish colored precipitate was filtered and recrystallized from ethanol (with carbon treatment) to yield 4.3 g. of 1-vinyl-2-[β-(4-formylphenyl ethylene acetal)vinyl]-5-nitroimidazole as fine yellow crystals melting at about 130–135° C. On recrystallization from ethyl acetate, there was obtained 3 g. melting at about 136–137° C.

*Analysis.*—Calc. for $C_{16}H_{15}N_3O_4$ (percent): C, 61.3; H, 4.8; N, 13.4. Found (percent): C, 61.5; H, 4.9; N, 13.6.

EXAMPLE 10

1-vinyl-2-[β-(4-formylphenyl)vinyl]-5-nitroimidazole

A solution of 23 g. (0.073 mole) of 1-vinyl-2-[β-(4-formylphenyl ethylene acetal)vinyl] - 5 - nitroimidazole, prepared as described in Example 9, in 100 ml. of tetrahydrofuran containing 2 ml. of added water was warmed to 40° C. and drops of concentrated hydrochloric acid were added. After about 15 minutes a crystalline precipitate formed and the reaction mixture allowed to stand overnight at room temperature. The crystalline precipitate was filtered to yield 17.6 g. of 1-vinyl-2-[β-(4-formylphenyl)vinyl]-5-nitroimidazole melting at about 195–196° C.

EXAMPLE 11

1-vinyl-2-[β-(4-hydroxymethylphenyl)vinyl]-5-nitroimidazole

A suspension of 1-vinyl-2-[β-(4-formylphenyl)vinyl]-5-nitroimidazole prepared as described in Example 10 in 100 ml. of n-propanol was cooled to 0° C. and a solution of 2.8 g. of sodium borohydride in 2.5 ml. of water added with stirring. On stirring for one hour, the crystalline precipitate which formed was filtered and recrystallized (carbon treatment) from ethyl acetate to yield 9.1 g. of 1-vinyl-2-[β-(4-hydroxymethylphenyl)-vinyl]-5-nitroimidazole melting at about 204–205° C.

*Analysis.*—Calc. for $C_{14}H_{13}N_3O_3$ (percent): C, 62.00; H, 4.81; N, 15.49. Found (percent): C, 61.99; H, 4.86; N, 15.46.

EXAMPLE 12

1-vinyl-2-[β-(4-carboxyphenyl)vinyl]-5-nitroimidazole

A solution of chromic acid prepared from 26.7 g. of chromium trioxide, 23 ml. of concentrated sulfuric acid and 40 ml. of water was made up to 100 ml. (8 N with respect to oxygen) and 0.4 ml. thereof added dropwise to a suspension of 1.3 g. of 1-vinyl-2-[β-(4-formylphenyl)-vinyl]-5-nitroimidazole in 30 ml. of acetone at 20° C. After about 30 minutes the reaction mixture was filtered, the precipitate washed with water, until free of green coloration, then with acetone and dried to yield 0.74 g. of product melting at about 300° C. with decomposition. Several like runs were combined and recrystallized from dioxane to yield 1-vinyl-2-[β-(4-carboxyphenyl)vinyl]-5-nitroimidazole melting at about 303–306° C. with decomposition.

*Analysis.*—Calc. for $C_{14}H_{11}N_3O_4$ (percent): C, 58.9; H, 3.86; N, 14.72. Found (percent): C, 59.3; H, 4.06; N, 14.56.

EXAMPLE 13

1-vinyl-2-[β-(4-formylphenyl)-vinyl]-5-nitroimidazole thiosemicarbazone

A hot solution of 0.5 g. of thiosemicarbazide in 30 ml. of ethanol was added to a boiling suspension of 0.5 g. of 1-vinyl-2-[β-(4-formylphenyl)vinyl] - 5 - nitroimidazole in 75 ml. of ethanol. A clear solution formed immediately and was allowed to stand at room temperature overnight. The crystalline precipitate was filtered to yield 0.6 g. of the thiosemicarbazone melting at about 253–255° C. with decomposition. Recrystallized from a large volume of ethanol, melting point was 253–255° C. with decomposition.

EXAMPLE 14

1-(β-hydroxyethyl)-2-[β-(1-methylimidaz-2-yl)vinyl]-5-nitroimidazole 2-methyl-5-nitroimidazole-1-ethanol, 8.6 g. was stirred under nitrogen with 40 ml. of ethanol at 70° C. and 10 ml. of 1-methylimidazole-2-carboxaldehyde added followed by the addition to a solution of 1.75 g. of sodium in 30 ml. of methanol. The clear pale yellow solution became dark brown and after about five minutes a fluffy mass of golden yellow crystals formed. After about 30 minutes, the reaction mixture was cooled and diluted with ethanol and the precipitate filtered, washed with ethanol and dried to yield 10 g. of 1-(β-hydroxyethyl)-2-[β-(1-methylimidaz-2-yl)vinyl] - 5 - nitroimidazole melting at about 225–226° C.

EXAMPLE 15

1-(β-p-toluenesulfonyloxyethyl)-2-[β-(1-methylimidaz-2-yl)vinyl]-5-nitroimidazole p-Toluenesulfonyl chloride, 15 g. was added dropwise to a partial solution of 21 g. of 1-(β-hydroxyethyl)-2-[β-(1-methylimidaz-2-yl)vinyl]-5-nitroimidazole in 155 ml. of pyridine at 0° C. The reaction mixture was warmed gradually to room temperature and allowed to stand overnight. The bright yellow solid precipitate was filtered to yield 13.2 g. of the tosylate melting at about 168–170° C.

EXAMPLE 16

The tosylate, 14 g., prepared as described in Example 15, was suspended in 100 ml. of ethanol and the suspension warmed to a temperature of 70° C. A solution of 0.7 g. of sodium in 50 ml. of ethanol was added with stirring and the reaction allowed to proceed for about 30 minutes. Undissolved starting material gradually went into solution followed by the formation of a crystalline precipitate. The reaction mixture was cooled and the orange-yellow crystalline precipitate filtered and washed with water before drying to yield 6.3 g. of 1-vinyl-2[β-(1-methylimidaz-2-yl)vinyl]-5-nitroimidazole melting at about 215–216° C. Recrystallization from boiling ethanol gave a melting point of about 217–218° C.

*Analysis.*—Calc. for $C_{11}H_{22}N_5O_2$ (percent): C, 53.49; H, 4.48; N, 28.44. Found (percent): C, 53.62; H, 4.56; N, 28.32.

Following the procedures as described in Examples 3, 4 and 5 and employing the appropriate aromatic aldehyde the following compounds were prepared. 1-vinyl-2-[β-(4-methylphenyl)vinyl]-5-nitroimidazole melting at about 137–8° C., 1-vinyl-2-[β-(4-n-butylphenyl)-vinyl]-5-nitroimidazole melting at about 88–9° C., 1-vinyl-2-[β-(4-ethylphenyl)vinyl]-5-nitroimidazole melting at about 135–6° C., 1-vinyl-2-[β-(4-n-propylphenyl)vinyl]-5-nitroimidazole melting at about 101–2° C., 1-vinyl-2-[β-(4-n-octylphenyl)vinyl]-5-nitroimidazole melting at about 65–6° C., 1 - vinyl - 2[β-(4-sec-butylphenyl)-vinyl]-5-nitroimidazole melting at about 77–8° C., 1-propenyl-2-[β-(4-isopropylphenyl)vinyl]-5-nitroimidazole melting at about 90–1° C., 1-propenyl-2-[β-(4-n-butylphenyl)vinyl]-5-nitroimidazole melting at about 80–1° C., 1-propenyl-2-[β-(4-methylphenyl)vinyl]-5-nitroimidazole melting at about 147–8° C.

We claim:

1. A compound of the formula:

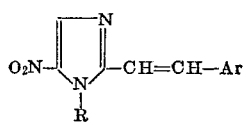

wherein R is

wherein $R_a$ and $R_b$ are hydrogen or $C_1$ to $C_8$ alkyl, Ar is an aryl or heteroaryl group of the formula Z—Q wherein Z is phenyl, naphthyl, biphenylyl, thienyl, furyl, pyrryl, pyridyl, thiazolyl or imidazolyl, Q is hydrogen, $C_1$ to $C_8$ alkyl, $C_1$ to $C_4$ lower alkoxy, halogen, carboxy, carbalkoxy, carboxamido, trifluoromethyl, nitro, amino, mono-lower alkylamino, di-lower alkylamino, aminomethyl, mono-loweralkylaminomethyl, di-lower alkylaminomethyl, hydroxymethyl, formyl or 1,3-dioxa-2-cyclopentyl.

2. The compound of claim 1 wherein R is

and Z is phenyl.

3. The compound of claim 2 said compound being 1-vinyl-2[β-(4-methylphenyl)vinyl]-5-nitroimidazole.

4. The compound of claim 2 said compound being 1-vinyl-2-[β-(4-isopropylphenyl)vinyl]-5-nitroimidazole.

5. The compound of claim 2 said compound being 1-vinyl-2-[β-(4-n-butylphenyl) vinyl]-5-nitroimidazole.

6. The compound of claim 2 said compound being 1-vinyl-2-[β-(4-formylphenyl)vinyl]-5-nitromidazole.

7. The compound of claim 2 said compound being 1-vinyl-2-[β-(4-carboxyphenyl)-vinyl]-5-nitroimidazole.

8. The compound of claim 1, said compound being 1-vinyl-2-[β-(1-methylimidaz-2-yl)vinyl]-5-nitroimidazole.

References Cited

UNITED STATES PATENTS

| | | | |
|---|---|---|---|
| 3,290,328 | 12/1966 | Kollonitsch | 260—309 |
| 3,378,552 | 4/1968 | Henry | 260—240 |
| 3,472,864 | 10/1969 | Henry et al. | 260—309 |

JOHN D. RANDOLPH, Primary Examiner

U.S. Cl. X.R.

424—273; 260—240 E, 309